(12) United States Patent
Doerfelt et al.

(10) Patent No.: US 12,521,700 B2
(45) Date of Patent: Jan. 13, 2026

(54) CHROMIUM-FREE WATER- AND ACID-STABLE CATALYST FOR HYDROGENATION REACTIONS

(71) Applicant: CLARIANT INTERNATIONAL LTD, Muttenz (CH)

(72) Inventors: Christoph Doerfelt, Munich (DE); Manuel Pfanzelt, Sauerlach (DE); Goetz Burgfels, Bad Aibling (DE); Frank Grossmann, Munich (DE); Maurice Frederic Pilz, Munich (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 765 days.

(21) Appl. No.: 17/775,620

(22) PCT Filed: Nov. 13, 2020

(86) PCT No.: PCT/EP2020/082131
§ 371 (c)(1),
(2) Date: May 10, 2022

(87) PCT Pub. No.: WO2021/099225
PCT Pub. Date: May 27, 2021

(65) Prior Publication Data
US 2022/0401928 A1    Dec. 22, 2022

(30) Foreign Application Priority Data

Nov. 22, 2019    (DE) .................... 10 2019 131 569.7

(51) Int. Cl.
| | | |
|---|---|---|
| *B01J 23/72* | (2006.01) | |
| *B01J 21/18* | (2006.01) | |
| *B01J 23/02* | (2006.01) | |
| *B01J 35/30* | (2024.01) | |
| *B01J 35/37* | (2024.01) | |
| *B01J 35/50* | (2024.01) | |
| *B01J 37/00* | (2006.01) | |
| *B01J 37/02* | (2006.01) | |
| *B01J 37/03* | (2006.01) | |
| *B01J 37/06* | (2006.01) | |
| *B01J 37/08* | (2006.01) | |
| *C07B 41/02* | (2006.01) | |

(52) U.S. Cl.
CPC .............. *B01J 23/72* (2013.01); *B01J 23/02* (2013.01); *B01J 35/30* (2024.01); *B01J 35/37* (2024.01); *B01J 35/50* (2024.01); *B01J 37/0018* (2013.01); *B01J 37/0236* (2013.01); *B01J 37/031* (2013.01); *B01J 37/06* (2013.01); *B01J 37/08* (2013.01); *C07B 41/02* (2013.01); *B01J 21/18* (2013.01); *B01J 2235/15* (2024.01)

(58) Field of Classification Search
CPC ... B01J 23/72; B01J 23/02; B01J 35/30; B01J 35/37; B01J 35/50; B01J 35/0018; B01J 21/066; B01J 37/0009; B01J 37/088
See application file for complete search history.

(56) References Cited

U.S. PATENT DOCUMENTS

| | | |
|---|---|---|
| 5,008,235 A | 4/1991 | Wegman |
| 5,403,962 A | 4/1995 | Schneider |
| 7,510,591 B2 | 3/2009 | Huber-Dirr |
| 8,871,985 B2 | 10/2014 | Van Vliet |
| 8,946,490 B2 | 2/2015 | Mirk |
| 10,035,137 B2 | 7/2018 | Paulus |
| 10,226,760 B2 | 3/2019 | Paulus |
| 10,639,616 B2 | 5/2020 | Paulus |
| 10,744,487 B2 | 8/2020 | Pfanzelt |
| 2010/0056364 A1* | 3/2010 | Huber-Dirr .............. B01J 23/83 502/184 |
| 2020/0001278 A1* | 1/2020 | Werner .................. B01J 35/633 |
| 2020/0197921 A1 | 6/2020 | Borchers |
| 2022/0152596 A1 | 5/2022 | Chen |

FOREIGN PATENT DOCUMENTS

| | | |
|---|---|---|
| CN | 1245162 | 2/2000 |
| DE | 4021230 | 1/1991 |
| EP | 0963975 | 12/1999 |
| JP | 2004203876 | 7/2004 |
| JP | 2010194420 | 9/2010 |
| JP | 2014517765 | 7/2014 |
| KR | 1020050116830 | 12/2005 |

OTHER PUBLICATIONS

Li Jifan et al., "Construction of mesoporous Cu/ZrO2—Al2O3 as a ternary catalyst for efficient synthesis of γ-valerolactone from levulinic acid at low temperature" Journal of Catalysis 381 (2020) 163-174.

* cited by examiner

*Primary Examiner* — Jafar F Parsa

(57) ABSTRACT

The present invention relates to an improved chromium-free Cu-Al catalyst for the hydrogenation of carbonyl groups in organic compounds, characterized in that the catalyst contains a proportion of zirconium in an amount of 0.5% to 30.0% by weight. The present invention additionally also relates to the preparation of the catalyst and to the use thereof in the hydrogenation of carbonyl groups in organic compounds.

17 Claims, No Drawings

CHROMIUM-FREE WATER- AND ACID-STABLE CATALYST FOR HYDROGENATION REACTIONS

The present invention relates to an improved chromium-free Cu—Al catalyst for the hydrogenation of carbonyl groups in organic compounds, characterized in that the catalyst contains a proportion of zirconium in an amount of 0.5% to 30.0% by weight. The present invention additionally also relates to the preparation of the catalyst and to the use thereof in the hydrogenation of carbonyl groups in organic compounds.

Catalytic processes for hydrogenating carbonyl groups in organic compounds such as esters, diesters, aldehydes or ketones are of great relevance in industry. They serve inter alia for the conversion of carboxylic acids or their esters, specifically esters of fatty acids, into the corresponding alcohols.

Suitable catalysts here are systems based on copper in combination with further transition metal elements. The catalysts are typically in the form of powders or shaped bodies, in particular tablets, extrudates or pellets.

WO 2004/085356 describes the preparation of a catalyst for the hydrogenation of carbonyl compounds that comprises, as well as copper and aluminum, at least one oxide of lanthanum, tungsten, molybdenum, titanium or zirconium, and to which has additionally been added copper powder or flakes, cement powder or graphite.

DE 40 21 230 A1 describes a process for preparing alcohols by hydrogenating an organic carboxylic ester compound in the presence of a copper-zirconium catalyst composed of copper, zirconium, and oxygen to afford a corresponding alcohol such as a higher alcohol or dihydric alcohol.

EP 0 434 062 A1 provides a process for hydrogenating a mixture of substances to the corresponding alcohols in which a catalyst is used that is prepared by co-precipitation of metals selected from Mg, Zn, Ti, Zr, Sn, Ni, C, and mixtures thereof.

The catalyst for the hydrogenation of carbonyl groups in organic compounds that is disclosed in EP 0 552 463 A1 has in its oxidic form the composition $Cu_aAl_bZr_cMn_dO_x$, where a>0; b>0; c>0; d>0; a>b/2; b>a/4; a>c; a>d; and x is the number of oxygen ions required per unit of the formula in order to preserve electroneutrality.

The starting mixtures of some hydrogenation processes generally contain traces of acidic compounds. These are for example carboxylic acids present as by-products in esterification reactions. Under the conditions of the hydrogenation reaction, these compounds attack the catalyst and result in a lowering of mechanical stability and sometimes the observation of partial leaching of the catalytically active metals, which are discharged from the reaction reactor with the product stream and have to be separated therefrom. Moreover, there is also a reduction in the catalytic activity of the catalyst with the progressive discharge of the catalytically active metals.

Catalysts containing copper and chromium are used for such reactions. These typically have enhanced stability to the action of acids. Because of stricter environmental regulations, the use of chromium-containing catalysts is associated with ever higher demands, and so there is a need to replace existing CuCr systems with environmentally compatible alternatives that nevertheless have comparable catalytic and physical properties.

Thus, WO2011115695A1 uses CuCr-containing catalysts for the hydrogenation of aldehydes to the corresponding alcohols.

The object of the present invention was therefore to provide a catalyst for hydrogenations of carbonyl groups in organic compounds that is less susceptible to the action of acidic compounds or water and, when in the form of a shaped catalyst body, is additionally distinguished by improved mechanical stability. In addition, it should be possible to use this catalyst particularly in hydrogenations that take place in an acidic and/or aqueous medium.

This object is achieved by the catalyst of the invention.

The invention relates to a chromium-free Cu—Al catalyst, characterized in that it has a zirconium content within a range from 0.5% to 30% by weight.

The catalyst may be present in various forms, for example in the form of a powder or in the form of shaped bodies such as extrudates, spheres, pellets or tablets. In a preferred embodiment, the shaped catalyst body is present in the form of a tablet.

When the shaped catalyst body is present in the form of tablets, the diameter of the tablets is usually between 2 and 6 mm and preferably between 3 and 5 mm. The diameter is particularly preferably between 4.4 and 4.6 mm. The height of the tablets may be between 2 and 6 mm and preferably between 2 and 4 mm. The height is particularly preferably between 2.5 and 3.5 mm.

The shaped catalyst body of the invention has a side crush strength of 80 to 500 N, preferably 150 to 250 N, more preferably 170 to 230 N. Preferably, the shaped catalyst body of the invention has a diameter within a range from 3 to 5 mm, a height within a range from 2 to 4 mm, and a side crush strength within a range from 170 to 230 N.

The pore volume, measured by mercury porosimetry, of the shaped catalyst body of the invention is between 100 and 500 mm$^3$/g, preferably between 150 and 400 mm$^3$/g, more preferably between 200 and 400 mm$^3$/g.

The amounts of copper, aluminum, and zirconium in the catalyst of the invention that are stated below relate to an oxidic, non-reduced form of the catalyst in which the elements are typically present in oxidized form as Cu(II), Al(III), and Zr(IV).

In a preferred embodiment, the catalyst in its oxidic form comprises Cu in an amount within a range from 20% to 50% by weight, preferably within a range from 25% to 40% by weight, Al in an amount within a range from 8% to 29% by weight, preferably within a range from 15% to 25% by weight, and Zr in an amount within a range from 0.5% to 30% by weight, preferably within a range from 5% to 20% by weight, more preferably within a range from 10% to 20% by weight, based on the total weight of the catalyst after loss on ignition.

In one embodiment, the catalyst does not contain manganese in oxidized or metallic form.

It is preferably a feature of the catalyst of the invention that it has a cubic zirconium dioxide phase. In one embodiment, at least one further ZrO$_2$ modification selected from orthorhombic and monoclinic zirconium dioxide is present in addition to the cubic zirconium dioxide phase.

The catalyst of the invention is prepared by the following steps according to the invention:
 a) combining (i) at least one aqueous solution A comprising copper compounds, zirconium compounds, and optionally further transition metal compounds and (ii) at least one aqueous alkaline solution B to form a precipitate, wherein solution A and/or solution B additionally include(s) a dissolved aluminum compound, b) separating off the precipitate, optionally washing the precipitate,
c) drying the precipitate to obtain a dried precipitate,
d) calcining the dried precipitate from step c) at a temperature of between 200 and 800° C. for a period of between 30 min and 4 h.

Suitable starting compounds for the compounds of copper, aluminum, zirconium, and optional transition metal that are employed in step a) are in principle all compounds that are soluble in water or in basic or acidic aqueous solutions. Preference is given to using carbonates, nitrates, halides, oxides, sulfates, acetates or formates.

The aluminum compound can here either already be present in the copper- and zirconium-containing solution A or it can be added together with the precipitant in the form of the aqueous alkaline solution B.

The proportion of the zirconium compound in solution A in step a) is chosen such that the proportion of zirconium in the final catalyst is within a range from 0.5% to 30% by weight based on the total weight of the catalyst after loss on ignition.

The at least one aqueous solution A of copper compounds, zirconium compounds, and optionally further transition metal compounds may be provided in the form of multiple separate aqueous solutions comprising copper compounds, zirconium compounds, and optionally further transition metal compounds, it being possible for any of these solutions to include an aluminum compound. For example, one or more aqueous solutions of copper compounds, one or more aqueous solutions of zirconium compounds, one or more aqueous solutions of aluminum compounds, and optionally one or more aqueous solutions of further transition metal compounds may be provided. Alternatively, one or more combined aqueous solutions may also be provided. These may be prepared by dissolving copper compounds and/or aluminum compounds and/or zirconium compounds and/or optionally further transition metal compounds in a common container. It is also possible to combine the separate solutions mentioned above into a combined solution.

In one embodiment, the at least one aqueous solution A of copper compounds, zirconium compounds, and optionally further transition metal compounds is, before being combined with the aqueous alkaline solution B, heated to a temperature above 20° C., for example a temperature within a range from 50° C. to 90° C., in particular to about 80° C., while preferably being stirred.

In a further embodiment, the aqueous alkaline solution B is, before being combined, heated to a temperature above 20° C., for example a temperature within a range from 50° C. to 90° C., in particular to about 80° C., while preferably being stirred.

In a further embodiment, the at least one aqueous solution A of copper compounds, zirconium compounds, and optionally further transition metal compounds and the aqueous alkaline solution B are both heated to a temperature within a range from 50° C. to 90° C., in particular to about 85° C., while preferably being stirred.

In one embodiment, the precipitate in step a) is formed by passing the aqueous alkaline solution B comprising the precipitant into solution A comprising the dissolved compounds of copper, aluminum, zirconium, and optional transition metal, preferably with constant stirring of the metal-containing solution.

In a further embodiment, the precipitate in step a) is formed by passing the aqueous alkaline solution B comprising the precipitant and the aluminum compound into solution A comprising the dissolved compounds of copper, zirconium, and optional transition metal, preferably with constant stirring of the metal-containing solution.

In a further embodiment, the aqueous alkaline solution B comprising the precipitant is fed into a common precipitation vessel together with the metal-containing solution A, wherein solution A and/or solution B additionally include a dissolved aluminum compound.

The temperature of the combined solutions in step a) is usually within a range from 10 to 90° C., preferably between 30 and 90° C., more preferably within a range from 50 to 85° C.

The pH during the precipitation of the metal-containing compounds in step a) is within a range from 6.0 to 8.0, preferably within a range from 6.5 to 7.5, more preferably within a range from 6.5 to 7.0.

After the precipitation, the resulting precipitate is separated off. This is typically done by filtration. Alternatively, the precipitate can also be separated off by decanting or centrifuging.

The separated precipitate can then optionally be subjected to one or more washing steps in order to remove any adhering impurities such as excess hydroxide ions or alkali metal ions. The precipitate can either remain directly in the filter chamber in the form of a filter cake and have a wash medium, preferably deionized water, passed through it, or it can alternatively be slurried in the wash medium and separated off again by means of a filter press, decantation or centrifugation. This process is usually repeated until the conductivity of the wash medium falls below a certain value. This is typically 0.5 mS/cm, in particular 0.2 mS/cm. The conductivity is determined in accordance with DIN 38404, part 8.

After being separated off and optionally washed, the precipitate is dried at a temperature within a range from 50 to 150° C., preferably within a range from 70 to 130° C., more preferably within a range from 80 to 120° C. The drying can take place in a spray dryer. Alternatively, drying can also take place in a stationary oven, in which case the drying time is usually within a range from 30 minutes to 6 h.

The dried powder is then subjected to calcination. This takes place at a temperature of between 200 and 800° C., preferably between 400 and 800° C., more preferably between 600 and 800° C., further preferably between 700 and 800° C. The duration of the calcination is between 30 minutes and 4 h, preferably between 1 and 3 h, and more preferably 2 h.

In one embodiment, the dried and calcined precipitate is then subjected to a shaping process. For this, the precipitate obtained from step d) is subjected to the following step:
e) shaping the calcined precipitate from step d) to obtain a shaped body.

Customary shaping processes are tableting, extrusion, and pelletization. In a preferred embodiment, the calcined precipitate is tableted.

Tableting is usually carried out with a tablet press such as a Kilian Pressima type press. The tableting is preferably carried out with the addition of lubricants such as graphite, oils or stearates, preferably graphite. For this, the calcined precipitate obtained in step d) is mixed with at least one lubricant, optionally compacted and/or granulated, and then tableted. The proportion of lubricant in the mixture is usually between 0.5% and 5.0% by weight, preferably between 1.0% and 4.0% by weight, based on the total weight of the composition to be tableted.

In one embodiment, a binder is added to the precipitate to be shaped. In principle, all compounds that increase the mechanical stability of the shaped body are suitable as binders. Suitable binders are aluminum oxide, such as pseudoboehmite, boehmite or corundum, silica, calcium aluminate, calcium silicate or clay minerals such as bentonite.

In one embodiment, calcium aluminate is used as binder. This is a compound containing Ca and Al in the form of oxides and/or hydroxides. For example, it comprises calcined calcium aluminates of general formula $xCaO \cdot yAl_2O_3$ or chemically precipitated calcium aluminates of general formula $Ca_xAl_y(OH)_z$. Depending on the treatment of the calcium aluminates, there may however alternatively be present intermediate stages between these two empirical formulas that are likewise suitable as binder material. As well as these elements, further elements may also be present in the calcium aluminate. In a preferred embodiment, the calcium aluminate contains further elements in a proportion by weight of less than 5.0% by weight, preferably less than 1.0% by weight, and more preferably less than 0.1% by weight, based on the weight of the calcium aluminate.

The atomic Ca/Al ratio of the calcium aluminate used in the present invention may vary and is preferably between 0.1 and 3.5, even more preferably between 0.3 and 2.0.

Suitable calcium aluminates are synthetically produced materials. Alternatively, it is possible to use naturally occurring calcium aluminates, for example katoite.

The calcium aluminate may be subjected to a thermal treatment (calcination) prior to use as binder material. This takes place at a temperature of between 300 and 800° C., preferably between 450 and 750° C., and more preferably between 450 and 650° C.

The binder is usually added to the mixture in such an amount that the content of binder in the shaped body is within a range from 2% to 30% by weight, preferably within a range from 2% to 10% by weight, and particularly preferably within a range from 2% to 5% by weight, based on the total weight of the shaped body after loss on ignition.

When calcium aluminate is used as a binder, the mixture is preferably additionally combined with water in order to heighten the binding effect of the calcium aluminate. Preferably, a thermally treated calcium aluminate is added to the mixture.

The calcium content of the shaped body bound with calcium aluminate is preferably within a range from 0.14% to 17.02% by weight, preferably within a range from 0.14% to 5.67% by weight, and more preferably within a range from 0.14% to 2.84% by weight, based on the total weight of the shaped body after loss on ignition.

When calcium aluminate is used as a binder, the proportion by weight of calcium aluminate in the shaped body can be determined by X-ray diffractometry. For this, the sample is measured in a Bruker D4 Endeavor over a range from 5 to 90° 2θ (step sequence 0.020° 2θ, 1.5 seconds measurement time per step). The radiation used is CuKα1 radiation (wavelength 1.54060 Å, 40 kV, 35 mA). During the measurement, the sample stage is rotated about its axis at a speed of 30 revolutions/min. The spectrum of reflection intensities obtained is quantitatively analyzed by means of a Rietveld refinement and the proportion of calcium aluminate in the sample is determined. The proportion of the respective crystal phases is determined using the TOPAS software from Bruker.

The shaped body obtained in step e) can then be subjected to a thermal treatment. For this, the shaped body obtained from step e) is subjected to the following step:

f) subjecting the shaped body to thermal treatment at a temperature of between 200 and 800° C. for a period of between 30 min and 4 h.

In one embodiment, the thermal treatment is carried out at a temperature of between 400 and 700° C. In a further embodiment, the duration of this thermal treatment is between 1 and 3 h and more preferably between 1.5 and 2.5 h.

The catalyst obtainable by the process of the invention may in a further step be reduced before it is used in the catalytic reaction.

The reduction is here preferably carried out by heating the catalyst in a reducing atmosphere. The reducing atmosphere is especially hydrogen. The reduction is carried out for example at a temperature within a range from 150° C. to 450° C., preferably within a range from 160° C. to 250° C., more preferably within a range from 170° C. to 200° C. The reduction is carried out for example over a period of 1 hour to 20 days, preferably over a period of 2 hours to 120 hours, more preferably over a period of 24 to 48 hours. In a preferred embodiment, the reduction is carried out at a temperature within a range from 190° C. to 210° C. over a period of 24 to 48 hours.

In a preferred embodiment, the catalysts are after the reduction stabilized in wet or dry form. In the case of wet stabilization, the catalysts are overlaid with a liquid in order to minimize contact with oxygen. Suitable liquids include organic liquids and water, preferably organic liquids. Preferred organic liquids are those having a vapor pressure at 20° C. of 0.5 hPa or less. Examples of such suitable organic liquids are isodecanol, Nafol, fatty alcohols, hexadecane, 2-ethylhexanol, propylene glycol, and mixtures thereof, particularly isodecanol. In the case of dry stabilization, a mixture of oxygen or an oxygen-containing gas, preferably air, and an inert gas such as argon or nitrogen is metered into the reduction space. The concentration of oxygen in the mixture is preferably increased from about 0.04% by volume to about 21% by volume. For example, a mixture of air and inert gas can be metered in, wherein the ratio of air to inert gas is initially about 0.2% by volume air to 99.8% by volume inert gas. The ratio of air to inert gas is then increased gradually (for example continuously or stepwise) until ultimately, for example, 100% by volume air is being metered in (corresponding to an oxygen concentration of about 21% by volume). Without being bound to any particular theory, it is assumed that the metered addition of air or oxygen gives rise at the surface of the catalyst to a thin oxide layer having a thickness of, for example, 0.5 to 50 nm, preferably 1 to 20 nm, more preferably 1 to 10 nm, which protects the shaped catalyst body from further oxidation. In the case of dry stabilization, the reactor temperature is preferably 100° C. or less, more preferably 20° C. to 70° C., and most preferably 30° C. to 50° C. The reduction can be carried out ex situ or in situ in the reaction system filled with the catalyst.

The side crush strength of the shaped catalyst bodies in tablet form is after reduction from 50 to 250 N, preferably from 60 to 200 N, more preferably from 70 to 150 N.

The catalysts of the invention have improved stability to acidic media or water-containing media, such as organic solutions or organic gaseous mixtures containing acids and/or water as impurities. In addition to an improved side crush strength of the shaped catalyst bodies, this is manifested by a reduced loss of copper ions, which are critical to the catalytic activity, from the material. In addition, the shaped catalyst body of the invention also has a lower overall loss of metal ions, which is a sign of increased stability of the solid structure in respect of leaching of individual metal ions.

To determine the stability of the shaped catalyst bodies of the invention to the action of acids, the shaped bodies are subjected to treatment in an acid- and water-containing medium, after which the side crush strength of the shaped bodies thus treated and the proportion of metal ions in the acid- and water-containing medium are determined.

The present invention further provides a process in which the catalyst of the invention is used for the catalytic hydrogenation of carbonyl groups in organic compounds, said hydrogenation taking place in an acid- and/or water-containing medium. Possible reactions include the hydrogenation of aldehydes to alcohols, especially of oxoaldehydes to oxoalcohols, the hydrogenation of a fatty acid, for example through esterification, especially to fatty acid methyl esters, and subsequent hydrogenolysis, or the hydrogenation of ketones to the corresponding alcohols.

Typical acid values of the reaction media used here are within a range from 0.1 to 3.4 $mg_{KOH}/g_{solution}$, preferably within a range from 0.2 to 1.0 $mg_{KOH}/g_{solution}$. The acid value is a measure of the presence of acidic OH groups, for example in carboxylic acids, in a solution and can be determined for example by titrating a corresponding solution with a KOH solution to the neutralization point. The amount of KOH thereby consumed, based on the weight of the solution, corresponds to the acid value, expressed in $mg_{KOH}/g_{solution}$.

The water content in such reaction media is usually within a range from 0.1% to 5.0% by weight, preferably 0.2% to 5.0% by weight, more preferably 0.5% to 5.0% by weight, particularly preferably 0.5% to 3.0% by weight.

The fatty acids to be hydrogenated in the context of the present invention are saturated or unsaturated fatty acids, which are classified according to chain length into short-chain (up to 6-8 carbon atoms), medium-chain (6-8 to 12 carbon atoms), and long-chain (13 to 21 carbon atoms) fatty acids. Fatty acids having more than 22 carbon atoms can also be used.

EXAMPLES

The loss on ignition was in the context of the present invention determined in accordance with DIN 51081 by determining the weight of about 1-2 g of a sample of the material to be analyzed, then heating it to 900° C. under ambient atmosphere and storing it at this temperature for 3 h.

The sample was then cooled under an inert atmosphere and the residual weight measured. The difference in weight before and after thermal treatment corresponds to the loss on ignition.

The side crush strength (SCS) was determined in accordance with ASTM 04179-01 without predrying the tablets. This was done by measuring a statistically sufficient number of tablets (at least 20 tablets) and calculating the arithmetic mean of the individual measurements. This average corresponds to the side crush strength of a particular sample.

Chemical elements were determined by ICP (inductively coupled plasma) measurement in accordance with DIN EN ISO 11885.

The acid value was determined by mixing approx. 4 g of the sample solution with 25 mL of propanol and adding phenolphthalein as indicator. The solution was titrated at room temperature with a tetrabutylammonium hydroxide solution (0.1 mol/L in 2-propanol/methanol) until the color change. The acid value AV in $mg_{KOH}/g_{solution}$ is calculated according to $$AV = \frac{\text{Volume consumed} * c * M}{\text{Sample weight}} = \text{mg } KOH/\text{g sample}$$

where AV=acid value, volume consumed=volume of tetrabutylammonium hydroxide solution consumed in mL, c=concentration of the tetrabutylammonium hydroxide solution, M=molar mass of KOH, and sample weight=amount of the sample solution used in g.

The pore volume of the shaped catalyst body was measured by the mercury porosimetry method in accordance with DIN 66133 in a pressure range from 1 to 2000 bar.

The water content of the solutions was determined by the Karl Fischer method in accordance with ASTM E 203 (2016).

Example 1: Production of Inventive Catalyst 1

An aqueous solution 1 was prepared by adding 3530 g of $Cu(NO_3)_2 \cdot 3H_2O$ and 1843 g of $(ZrO)_2(OH)_2CO_3$ to 5000 mL of demineralized water. Complete dissolution of the salts was then achieved by adding 1550 mL of nitric acid. The acidic solution was made up to a total volume of 20 000 mL with demineralized water. The pH of the solution was −0.70. The solution was then heated to 80° C.

In addition, 1500 g of $Na_2CO_3$ and 2140 g of $NaAlO_2$ were dissolved in 22 000 mL of demineralized water; the pH of solution 2 was 12.23.

For the precipitation, a precipitation vessel was provided, which was filled with 8000 mL of demineralized water. Into this were introduced simultaneously the copper-containing solution 1 and the carbonate-containing solution 2. The dosing rate was adjusted such that the precipitation solution had a pH of approx. 6.5.

At the end of the addition and after precipitation was complete, the precipitate was filtered off and washed with demineralized water to remove adhering impurities until the wash water had a conductivity below 0.25 mS. The filter cake was then dried.

The dried powder was then calcined at 750° C. for 2 h.

The relative proportions by weight were Cu=29.9% by weight, Zr=17.5% by weight, and Al=20.6% by weight, based on the total mass after loss on ignition.

Example 2: Production of Inventive Catalyst 2

1706 g of the calcined powder obtained in example 1 was combined with 51 g of Secar 71 binder (31% by weight CaO, 69% by weight $Al_2O_3$), 5 g of demineralized water, and 34 g of graphite and mixed for 10 minutes to afford a homogeneous mixture. This mixture was first compacted and granulated and then pressed in a Kilian Pressima tablet press into tablets having a width of 4.5 mm and a height of 3 mm. The tablets were then finally subjected to calcination at 600° C. for 2 h. The bulk density of the tablets thus obtained was 1175 g/L. For use examples 3 and 4, tablets were produced according to the same procedure, with the difference that the tablets had a height of 3.0 mm and a width of likewise 3.0 mm. The relative proportions by weight in the tablets were Cu=29.0% by weight, Zr=17.0% by weight, Al=21.1% by weight, and 0.6% by weight Ca, based on the total mass after loss on ignition.

Example 3: Production of Inventive Catalyst 3

1706 g of the calcined powder obtained in example 1 was combined with 5 g of demineralized water and 34 g of graphite and mixed for 10 minutes to afford a homogeneous mixture. This mixture was first compacted and granulated and then pressed in a Kilian Pressima tablet press into tablets having a width of 4.5 mm and a height of 3 mm. The tablets were then finally subjected to calcination at 600° C. for 2 h. The relative proportions by weight in the tablets were Cu=29.9% by weight, Zr=17.5% by weight, and Al=20.6% by weight, based on the total mass after loss on ignition.

Comparative Example 1 (Comparative Catalyst A)

Catalyst A was prepared by precipitating a copper- and chromium-containing precipitate, converting it into the oxidic form by thermal treatment, and pressing it into tablets having a width of 4.5 mm and a height of 3 mm. The relative proportions by weight were Cu=37.5% by weight and Cr=23.0% by weight, based on the total mass after loss on ignition. For use examples 3 and 4, tablets were produced according to the same procedure, with the difference that the tablets had a height of 3.0 mm and a width of likewise 3.0 mm.

Comparative Example 2 (comparative catalyst B)

To prepare catalyst B, an aqueous solution 1 was prepared by dissolving 1250 g of $Cu(NO_3)_2 \cdot 3H_2O$, 220 g of $Mn(NO_3)_2 \cdot 4H_2O$, and 1800 g of $Al(NO_3)_3 \cdot 9H_2O$ in 9000 g of distilled $H_2O$. Solution 2 was prepared by dissolving 1720 g of $Na_2CO_3$ in 7500 g of distilled $H_2O$. The two solutions were heated separately to 80° C. while stirring. The two solutions were then metered into a precipitation vessel with continuous stirring. The resulting precipitate was filtered off and washed with distilled $H_2O$ to remove adhering impurities until the wash water had a conductivity below 0.25 mS. The filter cake was then dried. The dried powder was then subjected to thermal treatment at 750° C. for 3 h; the relative proportions by weight were Cu=44.8% by weight, Mn=7.0% by weight, and Al=17.92 by weight, based on the total mass after loss on ignition.

1706 g of this powder was combined with 51 g of Secar 71 binder, 5 g of demineralized water, and 34 g of graphite and mixed for 10 minutes to afford a homogeneous mixture. This mixture was first compacted and granulated and then pressed in a Kilian Pressima tablet press into tablets having a width of 4.5 mm and a height of 3 mm. The tablets were then finally subjected to calcination at 600° C. for 2 h. The relative proportions by weight in the tablets were Cu=43.5% by weight, Mn=6.8% by weight, Al=18.5% by weight, and Ca=0.6% by weight, based on the total mass after loss on ignition.

Comparative Example 3 (Comparative Catalyst C)

The powder for catalyst C was prepared in accordance with the method for preparing the powder for catalyst B, wherein the proportion of $Mn(NO_3)_2 \cdot 4H_2O$ was chosen such that the relative proportion by weight of manganese in the powder thus obtained, based on the mass after loss on ignition, was 0.1% by weight. The relative proportions by weight were Cu=49.7% by weight, Mn=0.1% by weight, and Al=20.0% by weight, based on the total mass after loss on ignition. 1706 g of the powder thus obtained was combined with 5 g of demineralized water and 34 g of graphite and mixed for 10 minutes to afford a homogeneous mixture. This mixture was first compacted and granulated and then pressed in a Kilian Pressima tablet press into tablets having a width of 4.5 mm and a height of 3 mm. The relative proportions by weight in the tablets were Cu=49.7% by weight, Mn=0.1% by weight, and Al=20.0% by weight, based on the total mass after loss on ignition. The bulk density of the tablets thus obtained was 1152 g/L.

A portion of the material obtained after tableting of comparative catalysts A, B, and C and of inventive catalysts 2 and 3 was subjected to a reduction. This was done by subjecting the sample to thermal treatment in a gas mixture of 2% by volume $H_2$ and 98% by volume $N_2$ at a temperature of 200° C. in order to bring about reduction of the CuO present to Cu. The sample then was cooled to room temperature under nitrogen and stored under liquid isodecanol. The side crush strength of this sample was then measured and used for use examples 1 to 3.

Use Example 1 (Stability Test)

For each of the inventive catalysts 2 and 3 and for each of the comparative catalysts A, B and C, the acid stability was determined by combining a quantity of tableted, reduced, and stabilized samples totaling 25 g with a liquid mixture comprising 75 g of an oxoaldehyde solution, a water content of 1% by weight, and an acid value of 0.2 $mg_{KOH}/g_{solution}$. This mixture was heated at 120° C. under a nitrogen atmosphere for 4 days. The tableted sample was at the end of the test separated from the liquid mixture. Its side crush strength was then immediately measured.

After performance of the test, the oxoaldehyde solution was analyzed for the presence of Cu, Al, Cr, Mn, and Zr.

TABLE 1

Side crush strengths of the catalysts

| Example | Side crush strength after reduction [N] | Side crush strength after acid/water treatment [N] |
|---|---|---|
| Catalyst 2 | 137 | 132 |
| Catalyst 3 | 95 | 84 |
| Comparative catalyst A | 97 | 86 |
| Comparative catalyst B | 93 | 74 |
| Comparative catalyst C | 47 | not measurable because the sample material was broken |

Table 1 shows clearly that the side crush strength of inventive catalysts 2 and 3 is after reduction already higher than that of the catalysts known from the prior art. The increased stability to the effect of acid and water is demonstrated even more clearly by the side crush strength values at the end of the test. Inventive catalyst 2 still has the highest value for side crush strength here, whereas by contrast the tablets of the chromium-free CuAlMn catalyst, comparative catalyst C, broke during the test and no meaningful measurement of the side crush strength was possible.

TABLE 2

Metal concentrations in the test solution after the stability test

| | Concentration of metals in test solution after test [ppm] | | | | |
|---|---|---|---|---|---|
| Example | Cu | Al | Cr | Mn | Zr |
| Catalyst 2 | 3 | 27 | — | — | 34 |

TABLE 2-continued

Metal concentrations in the test solution after the stability test

Concentration of metals in test solution after test [ppm]

| Example | Cu | Al | Cr | Mn | Zr |
|---|---|---|---|---|---|
| Catalyst 3 | 9 | 101 | — | — | 54 |
| Comparative catalyst A | 12 | — | 70 | — | — |
| Comparative catalyst B | 64 | 43 | — | 5510 | — |
| Comparative catalyst C | 69 | 116 | — | 31 | — |

The data from Table 2 show that the inventive catalysts are largely stable to a loss of copper species under the drastic test conditions, whereas this is markedly higher for the comparative catalysts.

These results illustrate the beneficial effect achieved by adding zirconium to a copper-containing catalyst, namely increased stability to acids and water, which is manifested both in higher mechanical stability and in lower loss of metals from the catalyst itself.

Use Example 2: Hydrogenation of Oxoaldehydes to Oxoalcohols

A bed with a volume of 100 mL of inventive catalyst 2 in the reduced and wet-stabilized form was introduced into a reactor and heated under a stream of nitrogen to temperatures within a range from 120 to 180° C., with a reaction time of 2 days at each temperature chosen. A liquid phase comprising 45% by weight of aldehyde, 25% by weight of the corresponding alcohol, and 30% by weight of by-products (paraffins, olefins, others), having a water content of 0.7% by weight and an acid value of 0.2 was then passed through the reactor.

The constituents of the product stream downstream of the reactor were analyzed by gas chromatography. The conversions and alcohol contents in the product stream calculated over the entire run time at the respective temperature are shown in Table 3.

For comparison, a sample of comparative catalyst A and a sample of comparative catalyst B were each subjected to the same conditions and the results obtained are likewise shown in Table 3.

TABLE 3

Conversions and alcohol fractions in the aldehyde hydrogenation at varying temperatures

| Example | Aldehyde conversion [% by weight] | | | Alcohol fraction in the product stream [% by weight] | | |
|---|---|---|---|---|---|---|
| | 120° C. | 140° C. | 180° C. | 120° C. | 140° C. | 180° C. |
| Catalyst 2 | 92.1 | 93.9 | 97.4 | 64.8 | 65.0 | 64.3 |
| Comparative catalyst A | 95.6 | 96.0 | 98.2 | 68.0 | 66.2 | 65.5 |
| Comparative catalyst B | 92.5 | 96.3 | 97.5 | 69.3 | 71.1 | 70.2 |

It is clear from Table 3 that the catalyst of the invention achieves aldehyde conversions under comparable test conditions that correspond approximately to those of the commercial chromium-containing catalyst A. Similar behavior is also demonstrated for the formation of the corresponding alcohol. The catalyst of the invention is thus an environmentally friendly alternative to the chromium-containing catalysts used up to now.

The data additionally show that, although comparative catalyst B achieves comparable conversions and even significantly improved alcohol formation, its low physical stability makes it unsuitable for use over a relatively long period of time under the drastic conditions of the reaction.

Comparative catalyst C was likewise used in the same test. However, the catalyst particles disintegrated during the test, which meant it was not possible to make any meaningful statement regarding aldehyde conversions and selectivities.

Use example 3: Hydrogenation of a fatty acid, e.g. through esterification and subsequent hydrogenolysis (FAME)

A bed with a volume of 5 mL of inventive catalyst 2 was introduced into a reactor in the reduced and wet-stabilized form, after which 200 mL of methyl laurate having a water content of 0.062% by weight and an acid value of 0.351 $mg_{KOH}/g_{solution}$ was metered in. The reactor was then sealed pressure-tight and heated to a temperature of 280° C. under a stream of nitrogen. A stream of water at a pressure of 175 bar was then fed through a valve into the reactor until the nitrogen had been completely displaced. Hydrogenation using the catalyst was then carried out by fluidizing the hydrogen in the reactor with the methyl laurate solution by means of a stirrer.

Samples of the solution were taken at regular intervals via an outlet valve and the constituents thereof analyzed by gas chromatography. Table 4 shows the resulting conversion values for methyl laurate, the selectivity, and the yield in respect of 1-dodecanol.

For comparison, a bed having a volume of 5 mL of comparative catalyst A was subjected to the same conditions, and the results obtained thereby are likewise shown in Table 4.

TABLE 4

Reaction data for the hydrogenation of methyl laurate

| Example | | Hours | | | | | |
|---|---|---|---|---|---|---|---|
| | | 1 | 2 | 3 | 4 | 5 | 6 |
| Catalyst 2 | Conversion | 11.3 | 28.4 | 43.9 | 57.5 | 70.5 | 80.1 |
| | Selectivity | 73 | 56.9 | 56.9 | 59.1 | 61.2 | 66.9 |
| | Yield | 8.3 | 16.2 | 25 | 34 | 43.1 | 53.5 |

TABLE 4-continued

Reaction data for the hydrogenation of methyl laurate

| Example | | Hours | | | | | |
|---|---|---|---|---|---|---|---|
| | | 1 | 2 | 3 | 4 | 5 | 6 |
| Comparative catalyst A | Conversion | 5.5 | 13.1 | 31.4 | 31.5 | 40.6 | 47.7 |
| | Selectivity | 98.2 | 63.8 | 42.1 | 41.9 | 39.2 | 42.4 |
| | Yield | 5.4 | 8.3 | 13.2 | 13.2 | 15.9 | 20.2 |

We claim:

1. A Cu-Al catalyst, wherein the catalyst contains zirconium in a proportion by weight of 10% to 20%, copper in an amount within a range from 20% to 50% by weight, and aluminum in an amount in the range of 8% to 29% by weight, each based on the total weight of the catalyst after loss on ignition.

2. The catalyst as claimed in claim 1, wherein the catalyst contains Cu in an amount within a range from 25% to 40% by weight, and Al in an amount within a range from 15% to 25% by weight, based on the total weight of the catalyst after loss on ignition.

3. The catalyst as claimed in claim 1, wherein the catalyst is present in the form of a shaped body.

4. The catalyst as claimed in claim 3, wherein the shaped catalyst body is present in tablet form.

5. The catalyst as claimed in claim 3, having a binder content within a range from 2% to 30% by weight, based on the total weight of the shaped body after loss on ignition.

6. The catalyst as claimed in claim 5, wherein the binder is calcium aluminate.

7. The catalyst as claimed in claim 6, wherein the proportion of calcium in the shaped body is within a range from 0.14% to 17.02% by weight, based on the total weight of the shaped body after loss on ignition.

8. The catalyst as claimed in claim 3, wherein the side crush strength is 80 to 500 N.

9. The catalyst as claimed in claim 1, having a cubic zirconium dioxide phase.

10. The catalyst as claimed in claim 1, wherein the catalyst does not contain manganese in oxidized or metallic form.

11. A process for hydrogenating carbonyl groups in an organic compound, the process comprising contacting the organic compound and hydrogen with the catalyst as claimed in claim 1.

12. The process as claimed in claim 11, wherein the water content of the reaction stream is 0.1% to 5.0% by weight.

13. The process as claimed in claim 11, wherein the acid value of the reaction stream is within a range from 0.1 to 3.4 $mg_{KOH}/g_{solution}$.

14. The process as claimed in claim 11, wherein the organic compound is an aldehyde.

15. The process as claimed in claim 11, wherein the organic compound is a fatty acid methyl ester.

16. The process as claimed in claim 11, wherein the organic compound is a ketone.

17. The catalyst as claimed in claim 1, having a cubic zirconium dioxide phase.

* * * * *